United States Patent [19]

Larsen

[11] Patent Number: 6,010,624
[45] Date of Patent: Jan. 4, 2000

[54] CONTAMINATED SEDIMENT TREATMENT PROCESS

[76] Inventor: Paul Larsen, 2779 SW. 22 Ave., Miami, Fla. 33133

[21] Appl. No.: 09/045,996

[22] Filed: Mar. 23, 1998

[51] Int. Cl.$^7$ .................................................. C02F 11/14
[52] U.S. Cl. ...................... 210/195.1; 37/307; 210/196; 210/199; 210/202; 210/205; 210/242.1; 425/62
[58] Field of Search ...................... 37/307, 345; 210/170, 210/195.1, 195.3, 196, 199, 202, 205, 241, 242.1; 425/62

[56] References Cited

U.S. PATENT DOCUMENTS

| | | | |
|---|---|---|---|
| 3,893,656 | 7/1975 | Opacic et al. | 210/199 |
| 4,518,508 | 5/1985 | Conner | 210/911 |
| 4,698,163 | 10/1987 | Zibrida | 210/713 |
| 4,808,305 | 2/1989 | Arnold | 210/170 |
| 5,039,428 | 8/1991 | Wentzler et al. | 210/711 |
| 5,377,604 | 1/1995 | Pichat | 588/256 |
| 5,468,435 | 11/1995 | Hancock, Jr. | 425/62 |
| 5,643,443 | 7/1997 | Ishikura | 210/113 |
| 5,656,174 | 8/1997 | Hodges et al. | 210/705 |
| 5,795,285 | 8/1998 | McLaughlin et al. | 210/768 |

*Primary Examiner*—Peter A. Hruskoci
*Attorney, Agent, or Firm*—Malloy & Malloy, P.A.

[57] ABSTRACT

A system and method for the treatment of contaminated sediment found in rivers, lakes and certain bodies of water, wherein the contaminated sediment is removed from the body of water as part of a liquified mixture including both water and the contaminated sediment. The water is separated from the contaminants by treating the sediment through the introduction of a solidifying compound, certain specified sorbents and a cementitious material. The result is a solidification of the treated contaminants into a solid structural configuration which facilitates disposal of the resulting solidified contaminants as by ocean dumping or disposal at an appropriate landfill site.

16 Claims, 2 Drawing Sheets

CONTAMINATED SEDIMENT TREATMENT PROCESS

BACKGROUND OF THE INVENTION

1. Field of the Invention

This invention relates to both a treatment and a method of processing contaminated sediment of the type normally found in a body of water such as a river, lake, etc. as a result of pollution. The contaminated sediment, once collected and separated from the body of water is stabilized and caused to be solidified into a solid structural configuration which facilitates disposal in a safe manner.

2. Description of the Related Art

The problem of waste disposal has grown dramatically with the growth of the overall population as well as the worldwide increase of modern day industrialization facilities. Even though there are in existence widely accepted techniques for reducing pollution, the accumulation of waste of both the industrial and non-industrial variety continues to increase to the extent that safe disposal of waste is one of the major problems existing in most industrialized countries of the world.

The attempts to develop meaningful and effective waste disposal facilities have resulted in the development of numerous technologies directed to this specific problem. By way of example, techniques involving the stabilization or isolation of waste materials, particularly but not exclusively, hazardous waste materials, have long been recognized as effective means in the treatment of waste for the purposes of eventual disposal. Indeed, in utilizing any treatment system and/or method, the overall goal is the treatment of waste to obtain the most inert and insoluble form which is chemically and economically feasible.

More particularly, stabilization systems attempt to reduce the solubility or chemical reactivity of waste by changing its chemical state or by physical entrapment of the waste in some type of surrounding barrier. Isolation systems and processes attempt to place the waste into an easily handled solid with reduced hazards from volatilization, leaching, spillage, etc. These two processes or systems are often used in conjunction with one another because they have a common purpose of improving the containment of potential pollutants in the treatment and eventual disposal of waste. The combined utilization of these two systems or processes are often termed "waste fixation" or "encapsulation". While isolation and stabilization of waste materials is widely practiced in the disposal of radioactive waste, some general techniques may be applicable to the treatment of more conventional waste sources.

Regulations pertaining to the disposal of general hazardous waste requires that the waste be converted into a free standing solid containing a minor amount of free water. Unfortunately, however, when dealing with contaminated sediments in large bodies of water, minimization of free water can be difficult to achieve. Specifically, present environmental regulations provide that contaminated water, once removed from a body of water, cannot be drained back into or otherwise returned to the body of water from which it came unless it is within acceptable levels of purity. Naturally these guidelines require treatment and/or purification of the water, or disposal of the water, procedures that can be difficult or impractical using known methods. For example, water is very difficult to dispose of because of its fluid state, and water purification can often be a time consuming or a specialized thing requiring extensive containment of the fluid. Moreover, mere filtration of the fluid does not suffice due to the microscopic nature of many contaminants.

As such, there is still a need in the waste treatment and disposal area for the treatment and processing of more conventional sites such as rivers, lakes, etc. wherein such bodies of water include extremely large amounts of contaminated waste created through the result of exposing such bodies of water to industrial as well as non-industrial pollutants on a continuous and long term basis. A preferred system specifically designed for the effective treatment of contaminated sediment associated with polluted bodies of water should be sufficiently economical to allow the large scale application of such a preferred system. Moreover, it should preferably be structured to eliminate the needs for the transport and storage of the large volumes of water for treatment. Similarly, a preferred method of practicing such a system also should be effective to the point of reducing the collected contaminated sediment waste into a form which is safe for disposal without fear or danger of re-contaminating the environment at the site or location of disposal.

SUMMARY OF THE INVENTION

The present invention relates to a system and method for the treatment of waste material, namely, contaminated sediment found in generally polluted bodies of water such as but not limited to rivers, lakes, streams, etc. In order to facilitate, a comprehensive treatment of such contaminated sediment, a primary support platform is used to house and/or support the various processing facilities utilized to accomplish the stabilization and solidification of the contaminated sediment once it is removed from the body of water.

More specifically, a retrieval assembly in the form of a crane or the like and preferably a clam shell type of removal bucket are used to capture the contaminated sediment and remove it physically from the body of water. Naturally, utilization of such heavy duty equipment will also include the removal of a certain amount of water associated with the contaminated sediment. Therefore, the contaminated sediment is generally removed in the form of a liquified mixture. This liquified mixture is placed in a first treatment facility mounted on the primary platform wherein it is combined with a first quantity of solidifying compound, preferably in the form of finely ground calcium carbonate, such that the contaminants, most of which are embodied in the contaminated sediment, in the liquified mixture substantially bonds or adsorbs thereto. As will be explained in greater detail hereinafter, the referred to "first quantities" of calcium carbonate may, in a preferred embodiment of the present invention, be previously "used" in the sense that the calcium carbonate added to the liquified mixture may be derived from an additional step in the treatment and processing of the waste. The first treatment facility is structured to provide for the effective removal of a majority of the contaminants now bonded to the first quantity of solidifying compound from the water which, as set forth above, defines a portion of the liquified mixture generally in the form of the contaminated sediment.

The remaining water is transferred to a second treatment facility or vessel wherein a second quantity of solidifying compound, again preferably in the form of finely ground calcium carbonate is added thereto such that the contaminants in the liquified mixture substantially bonds or adsorbs thereto. Specifically, upon the initial separation and removal of the water from the liquified mixture and specifically from the contaminants contained therein, there will remain a certain amount of residual or remaining contaminants transferred with the water into the second treatment facility. Accordingly, the purpose of adding the second quantity of solidifying compound would be to further cause bonding thereof with the remaining contaminants in the now separated water. Upon this occurrence, the separated water is then filtered from the second quantity of solidifying compound with the remaining contaminants bonded thereto and the separated water is now acceptable to be returned back to the original body of water being treated. Upon return of the separated water to the original body of water, the second quantity of solidifying compound or calcium carbonate with the remaining contaminants bonded thereto is preferably returned to the first treatment facility so as to define the first quantity of solidifying compound.

A feature of the present invention, therefore, is the utilization of the aforementioned "second quantity" of solidifying compound as the "new", preferably finely ground calcium carbonate originally added to the second treatment facility. Again, after binding with the remaining contaminants in the separated water, the "used" calcium carbonates serves as the first quantity initially added to the liquified mixture removed from the body of water. The quantities or amounts of calcium carbonate utilized will ensure that all contaminants accomplish an effective bonding and is based on the volume of liquified mixture being processed. For example, in the first treatment facility there is a large concentration of contaminated sediment such that substantial bonding, even with the "used" calcium carbonate will be achieved. In the second treatment facility, however, the volumes of contaminants are quite small, and greater amounts of free calcium carbonate, which is preferably finely ground to maximize an exposed surface area, are preferred.

Once the solidifying compound with the contaminants bonded thereto has been fully and completely separated from the liquified mixture, it is transferred to a mixing chamber or facility wherein additional materials are added for purposes of forming and defining a molding compound. More specifically, predetermined amounts of a sorption material as well as predetermined quantities of a cementitious material, preferably in the form of a fast setting, hydraulic cement, are added to the mixing facility along with the contaminants and solidifying compound separated from the liquified mixture. Proper mixing takes place to form the aforementioned and desired molding compound. The molding compound is then transferred to a molding facility.

The resulting molding compound is thereby formed into a plurality of solid structure configurations which will facilitate the type of disposal intended. Curing or hardening facilities of the molded structures are provided so as to properly cure or solidify the plurality of molded structures into solid configurations. Off-loading may be accomplished by any adequate means such that the eventual disposal destination will include but not be limited to ocean dumping and/or placement at an appropriate landfill site.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
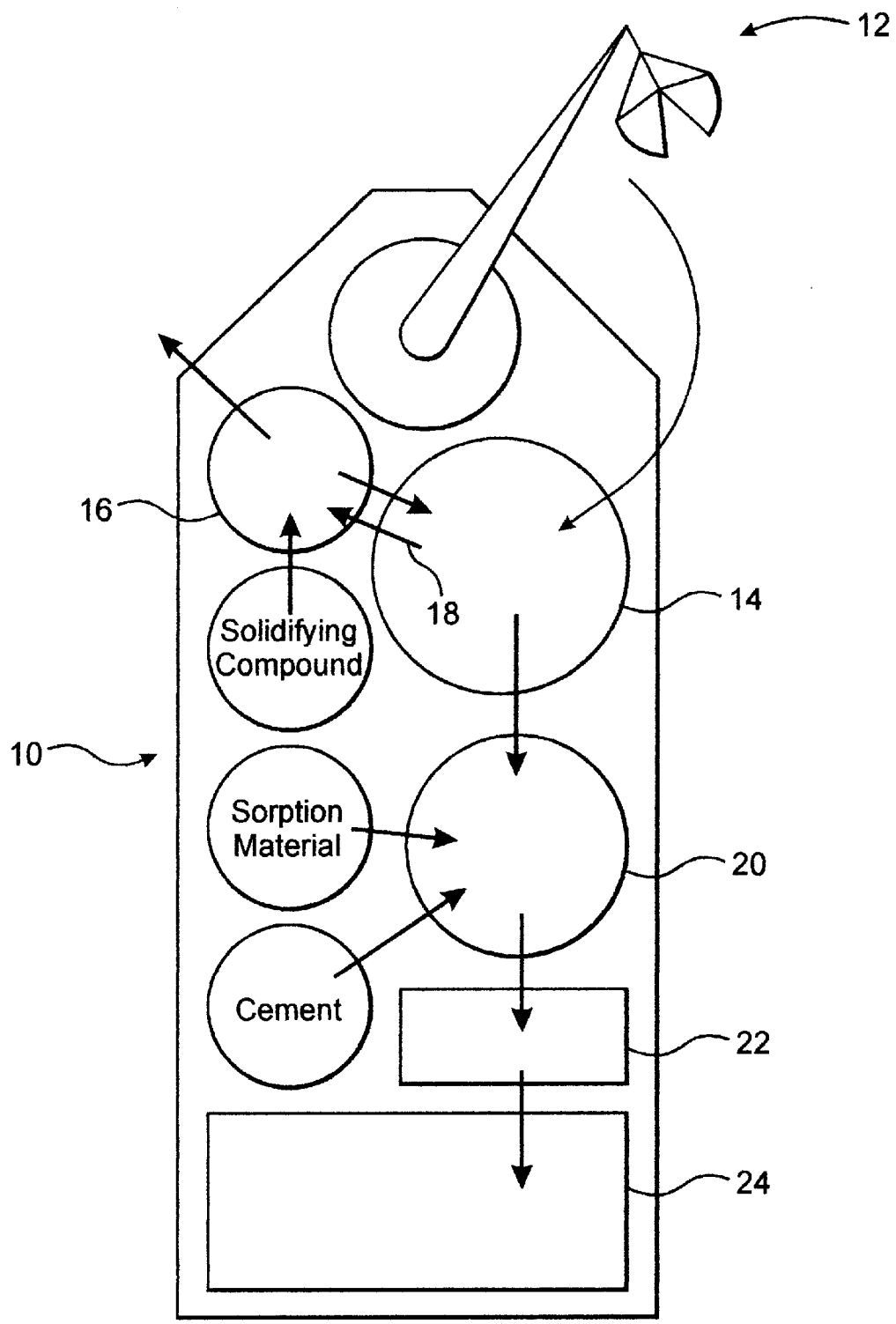
FIG. 1 is a schematic representation of certain structural components associated with the performance of the system of the present invention.
Figure 2:
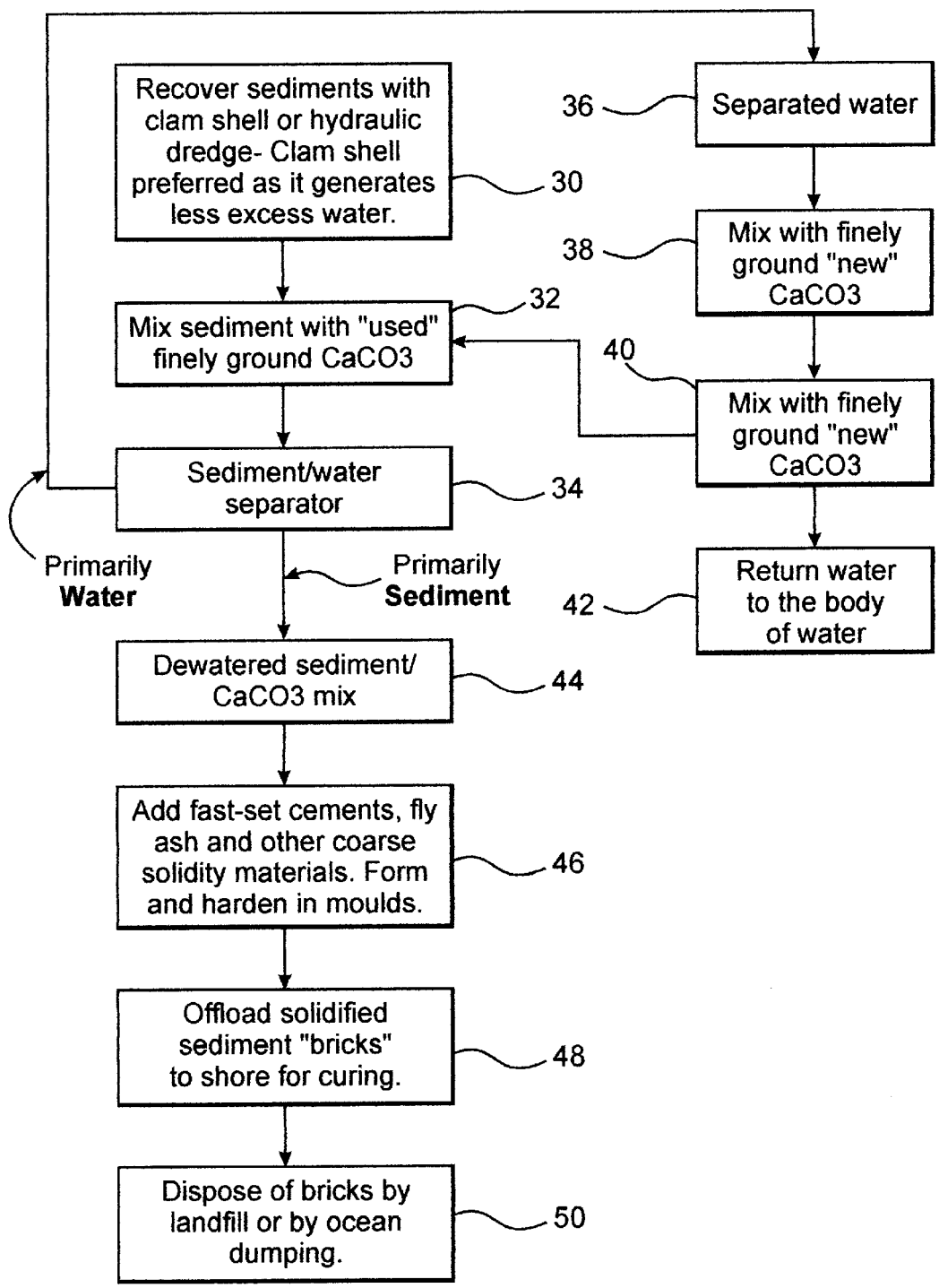
FIG. 2 is a flow chart indicating the various steps in the method involved in the performance of the subject system of the present invention.

As shown in FIGS. 1 and 2, the present invention relates to a system and method for the treatment of contaminants which is generally in the form of contaminated sediment found in bodies of water, including rivers, lakes, etc, and usually includes contaminated particulate such as physical granular particles, compounds and chemicals. Generally, the system involves the stabilization and solidification of the segregated contaminated sediment once removed from the body of water. As shown in FIG. 1, the system involves the utilization of a primary support platform generally indicated as 10. This support platform 10 is preferably sufficiently structured and dimensioned to hold the remainder of the processing components or facilities, as will be explained in greater detail hereinafter. Moreover, in a preferred embodiment of the present invention, and in order to facilitate efficient and widespread utilization of the subject system and method at remote offshore sites, this primary support platform 10 may be in the form of a floating vessel, such as a barge or the like. It is understood, however, that all or part of the assembly may be disposed on a stationary or moveable, land based support area/platform.

The platform 10 includes a retrieval assembly generally indicated as 12. The retrieval assembly is specifically structured to remove the contaminated sediment from the body of water in an effective manner and transfer such sediment to a first treatment facility indicated as 14. The removal of the sediment from the bottom of the body of water being treated will also result in the removal of a certain quantity of water, therefore the sediment removed will be in the form of a liquified mixture. In order to accomplish the minimization of water collected, it is preferred that the retrieval assembly 12 comprise a crane or like structure used with a clam shell type of scoop or removal bucket which will contain minimal amounts of water. Because of various environmental regulations, however, contaminated water, once removed from the body of water, cannot be returned to the body of water unless at an acceptable contaminant-free level. As such, it is preferred that the retrieval assembly also minimize water drained off during retrieval of the liquified mixture upon being transferred into the first treatment facility or housing as at 14.

Specifically, the first treatment facility 14 is specifically structured to accomplish at least an initial separation of the water from the contaminants, usually in the form of the contaminated sediment, but also including free floating contaminants, which define the aforementioned liquified mixture. Prior to or preferably as part of the separation, a first quantity of a solidifying compound is added to the first treatment facility 14 in a proper, predetermined amount, depending upon the volume of liquified mixture removed from the body of water and being processed. Although a variety of solidifying compounds may be utilized, in the preferred embodiment, the solidifying compound is preferably in the form of a finely ground calcium carbonate which bonds or adsorbs to the often metallic or ore based particulate in the liquified mixture which define the contaminants. Specifically, the contaminants, such as of the contaminated sediment particulate, which under normal circumstances may be difficult or impossible to filter from the water, will tend to bond with the calcium carbonate. Such bonding essentially forms "larger" and/or "heavier", more readily separatable particulate which can be separated from the water through filtration, the application of a centrifugal force, or other known methods of separating "larger" and/or "heavier" particulate from a fluid. Moreover, the solidifying compound is preferably finely ground so as to maximize a surface area thereof which can come into contact with contaminants.

Although the first quantity of solidifying compound may be "new" and previously unbonded with contaminants, one feature of the preferred embodiment of the present invention is the defining of the first quantity of solidifying compound as being "used". The "used" calcium carbonate added into the first treatment facility 14, as the preferred first quantity, is derived from an additional step in the process of the subject invention, as outlined in detail in FIG. 2, and thereby achieves waste minimization during the process by re-using a primary component. Indeed, the volume and concentrations of contaminants are quite large in the first treatment facility containing the previously untreated liquified mixture consisting primarily of sediments such that the relative amounts of free solidifying compound particulate need not be as great to bond with a substantial quantity of the contaminated sediment and make it more removable.

Upon separation of the water and the contaminated sediment of the liquified mixture, preferably at the first treatment facility, the water is transferred to a second treatment facility as at 16. The second treatment facility is structured to receive the separated water as at 18 which will likely still contain some remaining quantities of contaminants. This transfer can be accomplished utilizing gravity and various flow control valves and gates, or a pumping system. Furthermore, the evacuation of the separated water from the first treatment facility 14 can be accomplished as part of the separation of the contaminated sediment therefrom and/or, if desired, a continuous cycle may be established by adding more of the liquified mixture to the first treatment facility 14 upon separation and evacuation of the separated water from the first treatment facility 14.

In order to accomplish a further processing and "cleaning" of the separated water 18, a second quantity of solidifying compound, also preferably in the form of finely ground calcium carbonate is added to the second treatment facility 16. This calcium carbonate is preferably new, "unused" calcium carbonate and is added to the second treatment facility 16 containing the separated water with only the smaller amounts of contaminants. Specifically, the contaminants of the contaminated sediment can be more readily removed by the filtration process such that at this stage only a fluid "slurry" remains with a majority of the contaminants being mixed with the water itself. As such, higher concentrations of the second quantity of solidifying compound are available to bond with the relatively small quantities of remaining contaminants within the separated water and provide for a cleaner product to be returned to the body of water. Indeed, once the remaining contaminated sediment has been bonded to the newly added or "unused" solidifying compound or calcium carbonate, the remainder of the contaminants are removed and the separated water is returned to the original body of water in a much cleaner and environmentally acceptable state. Moreover, as the platform 10 is preferably in the nature of a floating vessel, this water need not be transported long distances to a land sight and then later returned to the body of water, and a relatively continuous processing at the removal site can be achieved.

Separation of the water from the second quantity of solidifying compound with the contaminants now bonded thereto occurs preferably at the second treatment facility 16 and preferably by filtering, separation by gravity and centrifugal force. Upon return of the separated water to the original body of water, the first quantity or "used" calcium carbonate with the remaining contaminants bonded thereto is then added or reintroduced into the first treatment facility 14. In a preferred embodiment of the present invention, the solidifying compound being received from the second treatment facility may thereby define the aforementioned "used" calcium carbonate defining the first quantity of solidifying compound added to the first treatment facility 14.

The contaminated sediment now separated from the liquified mixture in both the first and second treatment facilities 14 and 16 respectfully is thoroughly bonded with the quantities of calcium carbonate. All of the contaminated sediment present in the first treatment facility 14 is then transferred to a mixing facility as at 20, also preferably on the platform. The mixing facility 20 is specifically structured to mix the solidifying compound, such as the finely ground calcium carbonate, and the contaminants bonded thereto with predetermined quantities of a sorption material and predetermined quantities of a cementitious material. The structure of the mixing facility 20 is such as to thoroughly mix these various materials, as set forth above, to form a molding compound. In a preferred embodiment, the sorption material, referred to above, includes more coarsely ground calcium carbonate, and other compounds such as fly ash, while the cementitious material is preferably a fast setting, hydraulic cement. The formation of the molding material, once complete, is thereby transferred to a molding facility as at 22 in the form of one or more mold structures having predetermined configurations. The molding compound, once introduced to the molding facility 22 is thereby molded into preferably a plurality of predetermined configurations, having sizes and shapes which will facilitate the disposal of the waste material once cured. In one embodiment of the present invention, the molding facility 22 is structured to separate the molding compound formed in the mixing chamber or facility 20 into a large number of "bricks" or like structural configurations. The platform 10 may also include a curing or hardening facility as at 24 which will ensure that the molded structures or bricks are completely solidified into their intended molded structures. Once the bricks are hardened or cured, off loading may take place by any conventional facility capable of handling the large quantity and attendant weight associated with the solidified waste bricks.

In summary, the subject method of the present invention, as generally set forth in FIG. 2, utilizes the treatment, processing, mixing and molding facilities as well as the other structural features associated with the system components of FIG. 1. In the subject method, the contaminated sediment is removed as at 30 from a body of water being cleaned in the form of a liquified mixture in that a certain amount of water will be inherently contained with the contaminated sediment. This liquified mixture is transferred as at 32 to a first treatment facility 14, of FIG. 1, where it is mixed with the first quantity of solidifying compound which, in a preferred embodiment may be in the form of the finely ground, "used" calcium carbonate. Once the calcium carbonate has effected bonding with the contaminated sediment, as at 34, the water is separated and removed therefrom as indicated at 36. In order to provide a further cleansing of the separated water, to the point of economic effectiveness, a second quantity of solidifying compound as at 38 is added in the form of the aforementioned finely ground, "new" or "unused" calcium carbonate. This additional quantity will serve to effect additional bonding of the "new" calcium carbonate with any remaining contaminants found in the separated water and transferred with the water as at 18 in FIG. 1. Once such bonding occurs between the "new" calcium carbonate and the remaining contaminated sediment in the separated water, the separated water is returned as at 42 to the original body of water having obtained its maximum cleansing potential. Also, the "new" calcium carbonate having the water separated therefrom, preferably as by filtering, and now being bonded to any of the remaining contaminants is transferred therewith back to the first treatment facility 14 of FIG. 1 to define the aforementioned first quantity of "used" calcium carbonate.

Once complete bonding has occurred between the calcium carbonate defining the solidifying compound and the total amount of contaminants as at 44, the contaminants are transferred to the mixing facility as at 20 wherein a sorption material and a predetermined quantity of cementitious material are added. The mixing facility 20 is specifically structured to accomplish complete and thorough mixing so as to form a desired molding compound. The molding compound is then transferred to the molding structures or facilities as at 46 and 22 so as to form preferably a plurality of molded structures preferably in the form of bricks or any other desired molded structural configuration. Once cured and/or hardened as at 46 and 24 by the facilities indicated, the solidified contaminated sediment waste bricks are off-loaded as at 48 and eventually disposed of as at 50 at an appropriate landfill site or by ocean dumping or any other adequate means of disposal.

Predetermined quantities of solidifying compound or calcium carbonate, fly ash and coarser calcium carbonate defining the sorption material, and cementitious material, which may be in the form of a fast setting hydraulic cement, may exist in the range of 10% of each such material by volume of liquified mixture being processed. Naturally, other quantities may be found to be more effective from a stabilization/solidification standpoint once the economics of the entire system and process and their adaptation to a specific site have been determined.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A contaminated sediment treatment system comprising:
    a) a primary platform structured to be supportably disposed in a vicinity of a body of water containing contaminated sediment,
    b) a retrieval assembly disposed on said primary platform and structured to remove a liquified mixture comprising water and the contaminated sediment from the body of water,
    c) a first treatment facility structured to receive said liquified mixture,
    d) a first quantity of solidifying compound, said solidifying compound structured to be mixed in said first treatment facility and to bind with contaminants in said contaminated sediment of said liquified mixture,
    e) a separator assembly structured to separate a substantial quantity of said contaminated sediments, which have bound with said first quantity of solidifying compound, from said liquified mixture, such that a quantity of processed liquified mixture remains consisting primarily of liquids;
    f) a second treatment facility structured to receive said quantity of processed liquified mixture consisting primarily of liquids;
    g) a second quantity of solidifying compound structured to be disposed in said second treatment facility and further structured to bind with remaining quantities of contaminants contained in said quantity of processed liquified mixture,
    h) a filtration assembly structured to substantially remove said second quantity of solidifying compound with the remaining contaminants bound thereto from said water of said liquified mixture,
    i) a water return assembly structured to provide a return of said water of said liquified mixture to the body of water and
    j) a transfer assembly structured to introduce said second quantity of solidifying compound with said remaining contaminants bound thereto into said first treatment facility so as to define said first solidifying compound.

2. A system as recited in claim 1 further including a mixing facility structured to receive said first solidifying compound containing the contaminants bonded thereto from said first treatment facility and to mix said first solidifying compound containing the contaminated sediment bonded thereto with a quantity of sorption material and a quantity of cementitious material, thereby defining a molding compound.

3. A system as in claim 2 wherein said primary platform includes a floating vessel.

4. A system as in claim 3 wherein said first treatment facility, said second treatment facility, and said mixing facility are all mounted on said floating vessel.

5. A system as recited in claim 2 further including a molding assembly structured to receive and mold said molding compound into a solid, molded structure.

6. A system as in claim 5 further comprising a curing facility structured to harden said molded structure into a solid configuration.

7. A system as in claim 2 wherein said sorption material includes fly ash.

8. A system as in claim 7 wherein said sorption material includes coarsely ground calcium carbonate.

9. A system as in claim 1 wherein said primary platform is structured to be disposed in the body of water.

10. A system as in claim 9 wherein said primary platform includes a floating vessel.

11. A system as in claim 10 wherein said first treatment facility and said second treatment facility are mounted on said floating vessel.

12. A system as in claim 1 wherein said retrieval assembly comprises a crane assembly including a clam shell bucket structured and disposed to remove the liquified mixture from the body of water.

13. A system as in claim 1 wherein said second quantity of solidifying compound is finely ground so as to maximize a surface area thereof which can come into contact with said contaminants.

14. A system as in claim 13 wherein said first and said second quantities of solidifying compound include calcium carbonate.

15. A system as in claim 1 wherein said first and said second quantities of solidifying compound include finely ground calcium carbonate.

16. A contaminated sediment treatment system comprising:
    a) a primary platform structured to be supportably disposed in a vicinity of a body of water containing contaminated sediment,
    b) a retrieval assembly disposed on said primary platform and structured to remove a liquified mixture comprising water and contaminated sediment from the body of water, c) a first treatment facility structured to receive said liquified mixture, d) a first quantity of solidifying compound, said solidifying compound structured to be disposed in said first treatment facility and to bind with contaminants in said liquified mixture, e) a separator assembly structured to separate a substantial quantity of said contaminants, which has bound with said first quantity of solidifying compound, from said liquified mixture, such that a quantity of processed liquified mixture remains;

f) a second treatment facility structured to receive said quantity of processed liquified mixture;

g) a second quantity of solidifying compound structured to be disposed in said second treatment facility and further structured to bind with remaining quantities of contaminants contained in said quantity of processed liquified mixture, h) a filtration assembly structured to substantially remove said second quantity of solidifying compound with the remaining contaminants bound thereto from said water of said liquified mixture, i) a water return assembly structured to provide a return of said water of said liquified mixture to the body of water, j) a transfer assembly structured to introduce said second quantity of solidifying compound with said remaining contaminants bound thereto into said first treatment facility so as to define said first solidifying compound, k) a mixing facility structured to receive said first solidifying compound containing the contaminants bonded thereto from said first treatment facility and to mix said first solidifying compound containing the contaminants bonded thereto with a quantity of sorption material and a quantity of cementitious material, thereby defining a molding compound, and l) a molding assembly structured to receive and mold said molding compound into a solid, molded structure.

* * * * *